United States Patent

Miyawaki

[11] Patent Number: 6,036,131
[45] Date of Patent: Mar. 14, 2000

[54] MAGNETIC TAPE RECORDING AND/OR REPRODUCING APPARATUS AND REEL BRAKING MECHANISM THEREFOR

[75] Inventor: Chikanori Miyawaki, Neyagawa, Japan

[73] Assignee: Matsushita Electric Industrial Co., Ltd., Osaka, Japan

[21] Appl. No.: 08/875,876

[22] PCT Filed: Dec. 5, 1996

[86] PCT No.: PCT/JP96/03562

§ 371 Date: Dec. 3, 1997

§ 102(e) Date: Dec. 3, 1997

[87] PCT Pub. No.: WO97/21217

PCT Pub. Date: Jun. 12, 1997

[30] Foreign Application Priority Data

Dec. 7, 1995 [JP] Japan .................................. 7-318765

[51] Int. Cl.[7] .................................................. G03B 23/02
[52] U.S. Cl. .................. 242/336; 242/338.1; 242/355.1; 360/94; 360/96.3
[58] Field of Search .............................. 242/336, 338.1, 242/355.1; 360/94, 96.3

[56] References Cited

U.S. PATENT DOCUMENTS

| | | |
|---|---|---|
| 3,921,933 | 11/1975 | Rotter et al. . |
| 4,635,146 | 1/1987 | Koda et al. .................. 360/96.3 X |
| 4,730,792 | 3/1988 | Jang ..................... 242/355.1 |
| 4,984,109 | 1/1991 | Yokoo ...................... 360/94 |
| 5,004,180 | 4/1991 | Okamura et al. ............. 242/338.1 |
| 5,114,093 | 5/1992 | Kunimaru et al. ........... 242/335.1 |
| 5,301,897 | 4/1994 | Park ...................... 242/335.1 |
| 5,601,249 | 2/1997 | Schandl et al. ............. 242/355.1 |
| 5,669,568 | 9/1997 | Kang et al. ............... 242/355.1 |
| 5,669,569 | 9/1997 | Lee ....................... 242/355.1 |
| 5,716,019 | 2/1998 | Ahn ....................... 242/355.1 |
| 5,734,520 | 3/1998 | Okuda et al. ............... 360/94 X |

FOREIGN PATENT DOCUMENTS

| | | |
|---|---|---|
| 743 647 | 11/1996 | European Pat. Off. . |
| 2830319 | 2/1979 | Germany ................. 360/96.3 |
| 145139 | 11/1980 | Germany ................. 360/96.3 |
| 182654 | 8/1986 | Japan ..................... 360/96.3 |
| 5-151655 | 6/1993 | Japan . |
| 6-36395 | 2/1994 | Japan . |
| 7-085534 | 3/1995 | Japan . |
| 7-130045 | 5/1995 | Japan . |
| 2 293 914 | 4/1996 | United Kingdom . |

*Primary Examiner*—Donald P. Walsh
*Assistant Examiner*—Minh-Chau Pham
*Attorney, Agent, or Firm*—Wenderoth, Lind & Ponack, L.L.P.

[57] ABSTRACT

A reel braking mechanism for a magnetic tape recording and/or reproducing apparatus includes first and second reels (5L, 5R), and first and second reel support bases (3L, 3R) for rotatably supporting thereon the first and second reels, respectively the first and second reels are movable together with the first and second reel support bases (3L, 3R) between a first cassette position corresponding to a hub-to-hub distance in a standard tape cassette and a second cassette position corresponding to a hub-to-hub distance for a compact tape cassette. The reel braking mechanism includes a brake lever (7L, 7R) movably mounted on each of the first and second reel support bases (3L, 3R) and having a first arm (7a) engageable with the corresponding reel and a second arm (7b). The brake lever is movable between an engaged position in which the first arm (7a) is engaged with the corresponding reel to hold the reel and a disengaged position in which the first arm (7a) is disengaged from the corresponding reel. A pushing element (10L, 10R, 10a, 11L, 11R; 10L, 10R, 10a, 11L, 11R, 24L, 14R; 10L, 10R, 11L, 11R, 30L, 30R) for pushing the second arm (7b), regardless of the position of the corresponding reel, to urges the brake lever (7L, 7R) towards the engaged position to thereby cause the first arm (7a) to be brought into frictional engagement with the corresponding reel.

20 Claims, 6 Drawing Sheets

MAGNETIC TAPE RECORDING AND/OR REPRODUCING APPARATUS AND REEL BRAKING MECHANISM THEREFOR

BACKGROUND OF THE INVENTION

1. Field of the Invention

The present invention generally relates, although not exclusively limited thereto, to a magnetic tape recording and/or reproducing apparatus such as, for example, a video tape recorder and, more particularly, to a reel braking mechanism employed in the video tape recorder for braking at least one of supply and take-up reels in order to avoid slackening of a length of magnetic recording tape that extends between two hubs within a magnetic tape cassette mounted in the video tape recorder.

2. Background Art

The video tape recorder capable of accommodating magnetic tape cassettes of different sizes selectively one at a time has been known in the art. By way of example, VHS-ready video tape cassettes now in the market are available in two types, standard and compact, which have different cassette sizes from each other. The standard video tape cassettes are rather prominently used in home video tape recorders which are coupled with television receiver sets and the compact video tape cassettes are mainly used in compact and portable video cameras. Regardless of the size of the cassette, both use magnetic recording tape which has the same tape width and are compatible with each other so far as information recording and reproducing schemes are concerned.

When it comes to recording or reproducing information on or from the magnetic recording tape within the compact video tape cassette through the home video tape recorder, a cassette adaptor of a size and shape both resembling those of the standard video tape cassette has been needed.

However, in order for the compact video tape cassette to be utilizable in the home video tape recorder without needing to use the cassette adaptor, a video tape recorder has been suggested in which when the compact video tape cassette is loaded in the video tape recorder, supply and take-up reels then spaced from each other a distance corresponding to the hub-to-hub distance of the standard video tape cassette can be driven to a position where the reel-to-reel distance attains a value corresponding to the hub-to-hub distance of the compact video tape cassette. An example of the suggested video tape recorder of the type having a capability of adjusting the reel-to-reel distance is shown in FIGS. 13 and 14.

Figure 13:
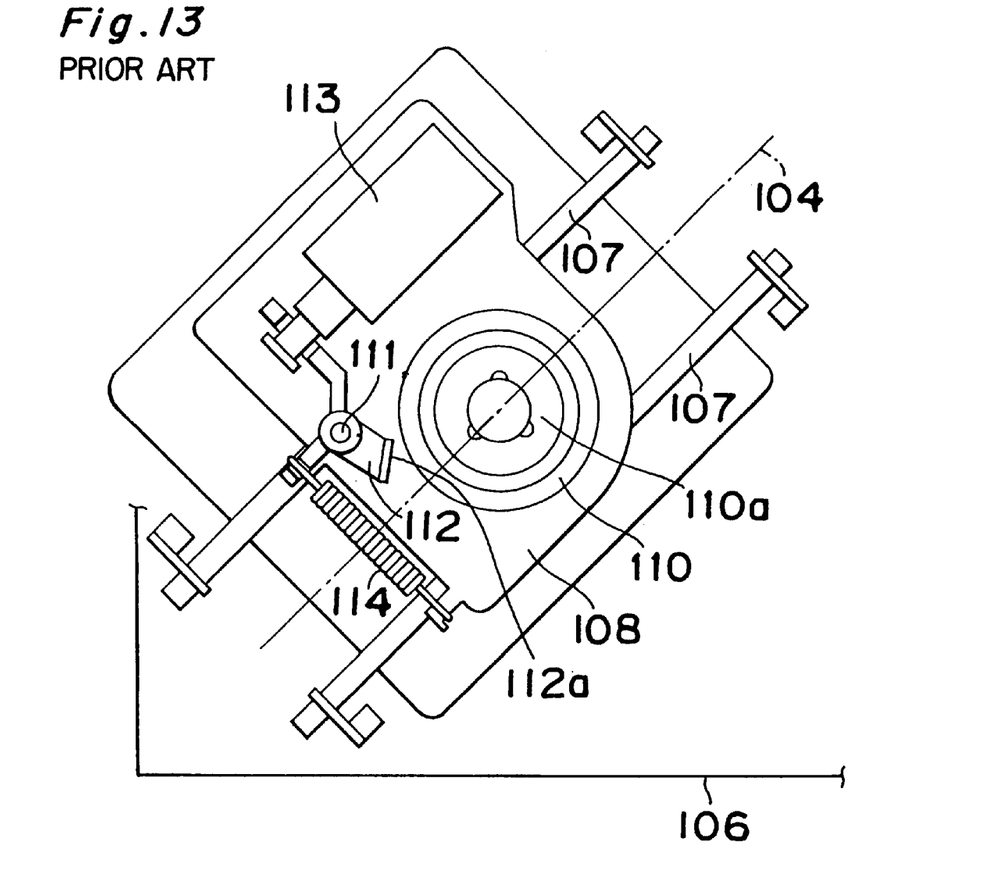
FIG. 13 is a schematic top plan view showing a prior art reel braking mechanism, associated with only the supply reel, which is employed in a video tape recorder.
Figure 14:
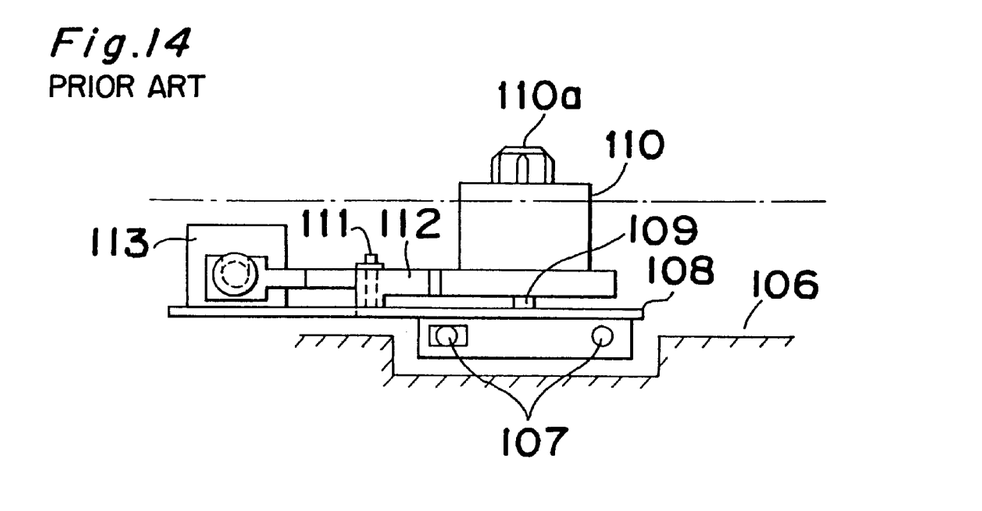
FIG. 14 is a schematic side sectional view of a reel braking mechanism shown in FIG. 13.

In the video tape recorder of the known type shown in FIGS. 13 and 14, the supply and take-up reels are simultaneously movable between standard and compact cassette positions. The supply and take-up reels are movable along respective straight paths extending at an angle relative to each other so as to converge at a point away from the imaginary line connecting between respective axes of rotation of the supply and take-up reels. Since in this example the supply and take-up reels are rotatably supported in the same manner, reference will be made only to one of them, for example, the supply reel, and its associated parts.

Referring to FIGS. 13 and 14, a supply reel 110 is integrally formed with a reel spindle 110a and is engageable with any one of the hubs in any one of the standard and compact video tape cassettes. This supply reel 110 is rotatably mounted on a reel base 108 through a support shaft 109. Although not shown, the support shaft 109 is in turn drivingly coupled with a drive motor disposed beneath the reel base 108, either directly or through a drive transmission mechanism. The reel base 108 is movably mounted on a guide rail mechanism including two parallel guide rods 107 fixed at opposite ends thereof to a chassis of the video tape recorder and, therefore, the supply reel 110 is movable between the standard and compact cassette positions along the parallel guide rods 107.

In order to permit information to be recorded or reproduced on or from a length of magnetic recording tape in a stable fashion regardless of whether the tape cassette mounted is a standard video tape cassette or whether it is a compact video tape cassette, a reeled length of magnetic recording tape must be held still without being loosened within the video tape cassette when the video tape recorder is in an inoperative position (i.e., when actual information recording or reproduction is not called for when a reel drive mechanism is halted). To avoid the loosening of the reeled length of the magnetic recording tape, a reel braking mechanism has been employed.

The reel braking mechanism shown in FIGS. 13 and 14 comprises a solenoid unit 113 mounted on the reel base 108 and having a plunger, and a brake lever 112 having one end connected to the solenoid plunger and the other end provided with a brake pad 112a. A generally intermediate portion of the brake lever 112 is pivotally mounted on the reel base 108 through a support pin 111 so that when the solenoid unit 113 is electrically energized to retract the solenoid plunger, the brake lever 112 can be pivoted clockwise (or, counterclockwise so far as the tape-up reel, not shown, is concerned) about the support pin 111 with the brake pad 112a consequently separated away from the supply reel 110. However, since the brake lever 112 is biased counterclockwise about the support pin 111 by the action of a biasing spring 114 so long as the solenoid unit 113 is deenergized, the brake pad 112a is frictionally engaged with the supply reel 110 to prevent the length of magnetic recording tape within the tape cassette from being loosened.

According to the prior art shown in FIGS. 13 and 14, the solenoid unit is mounted on the corresponding reel base and is therefore movable together therewith. In other words, all component parts of the braking mechanisms associated respectively with the supply and take-up reels are mounted on the corresponding reel bases together with the associated reels and also together with the associated drive motors. Accordingly, the reel base for each of the supply and take-up reels must be of a size sufficient to accommodate not only the corresponding reel, but also the associated braking mechanism including the solenoid unit, the brake lever, the support pin and the biasing spring. Therefore, this requirement makes the video tape recorder as a whole bulky in size. Also, since the solenoid unit is mounted on the corresponding reel base, a space between the chassis and the bottom outer surface of the tape cassette when the reel spindles are engaged in the cassette hubs must be of a size to effectively avoid any possible contact between the mounted video tape cassette and top of the solenoid unit. That is, the space must be of a size corresponding to the sum of the height of the solenoid unit above the reel base and the clearance between the bottom of the solenoid unit and the chassis. This make it difficult to move the video tape recorder as a whole to have a compact size.

The video tape recorder of the type having the capability of adjusting the reel-to-reel distance such as discussed above is also disclosed in the Japanese Laid-open Patent Publication No. 5-151655, published Jun. 18, 1983, and the Japanese Laid-open Patent Publication No. 6-36395 published Feb. 10, 1994.

According to the Japanese Laid-open Patent Publication No. 5-151655, both of the supply and take-up reels are movable between the standard cassette position, in which the reel-to-reel distance corresponds to the hub-to-hub distance in the standard tape cassette, and the compact cassette position, in which the reel-to-reel distance corresponds to the hub-to-hub distance in the compact tape cassette, along a respective arcuate path about a support shaft through which an associated reel drive gear is rotatably mounted on a chassis. The braking mechanism employed in this known device includes a pivot lever employed for each of the supply and take-up reels, and is mounted on the chassis for pivotal movement between operative and inoperative positions. This pivot lever for each of the supply and take-up reels is provided with a brake pad frictionally engageable with the associated reel drive gear that is constantly meshed with a gear formed integrally with the corresponding reel. The reel drive gears are utilized to move the supply and take-up reels between the standard and compact cassette positions along the respective arcuate paths. The supply and take-up reels can be braked when the associated pivot levers are moved to the operative position with the corresponding brake pads consequently brought into frictional engagement with the reel drive gears. This prevents the length of magnetic recording tape within the tape cassette from being loosened regardless of whether the tape cassette mounted is a standard video tape cassette or whether it is a compact video tape cassette.

The braking mechanism disclosed in the Japanese Laid-open Patent Publication No. 5-151655 appears to be too complicated, because of the reel drive gear intervening between the brake lever and each of the supply and take-up reels. It, also, appears to be too complicated, because of the required sophisticated yet complicated mounts through which the supply and take-up reels can be supported on the chassis so as to revolve around the respective reel drive gears in meshed relation therewith.

On the other hand, the supply and take-up reels disclosed in the Japanese Laid-open Patent Publication No. 6-36395 are movable between the standard and compact cassette positions in a manner similar to those shown in and described with reference to FIGS. 13 and 14. The braking mechanism disclosed in this patent publication includes a trapezoidal brake plate mounted on a chassis for movement between engaged and disengaged positions, a biasing spring biasing the brake plate normally to the engaged position, and a brake pad secured to each of inclined edges of the brake plate for movement together therewith. A solenoid unit mounted on the chassis when energized during operation of the video tape recorder causes the brake plate, drivingly coupled therewith through a pivot lever, to move towards the disengaged position. However, when the solenoid unit is deenergized, the brake plate then held at the disengaged position is driven towards the engaged position by the biasing spring with the brake pads consequently brought into frictional engagement respectively with the supply and take-up reels. Each of the brake pads has a length sufficient to allow it to be frictionally engaged with the associated reel regardless of whether the supply and the take-up reels are held at the standard cassette position or whether they are held at the compact cassette position.

The braking mechanism disclosed in the Japanese Laid-open Patent Publication No. 6-36396 is advantageous in that the thickness of the video tape recorder as a whole can be reduced, that is, the video tape recorder can be compactly assembled, but has a problem in that the length of magnetic recording tape within the tape cassette cannot be smoothly braked to a halt.

Frictional engagements of the brake pads with the supply and take-up reels, respectively, take place simultaneously and under the same pressure when the brake plate is driven from the disengaged position to the engaged position by the action of the single biasing spring. However, the frictional force applied to the take-up reel from the corresponding brake pad acts in a direction of turn of the length of magnetic recording tape around the take-up reel relative to the direction of rotation of the take-up reel whereas the frictional force applied to the supply reel from the corresponding brake pad acts in a direction of departure of the length of magnetic recording tape from the supply reel relative to the direction of rotation of the supply reel. The braking force brought about by the frictional force acting in the direction of turn of the length of magnetic recording tape is higher than the braking force brought about by the frictional force acting in the direction of departure of the length of magnetic recording tape. Therefore, a difference occurs between the respective braking forces applied simultaneously to the supply and take-up reels. This difference in braking force does in turn bring about a difference between respective timings at which the supply and take-up reels are brought standstill even though the braking forces are simultaneously applied the supply and take-up reels, respectively. More specifically, due to the difference in braking force, the take-up reel can instantaneously braked to a halt, but the supply reel requires a substantial length of time before it is brought to a halt, resulting in loosening of the length of magnetic recording tape between the hubs within the tape cassette.

Also, since the single brake plate is used to apply braking forces to the supply and take-up reels, respectively, a problem has been found that one of the supply and take-up reels cannot be halted while the other of the supply and take-up reels is allowed to rotate.

SUMMARY OF THE INVENTION

The present invention has been devised to substantially eliminate the above discussed problems found in the prior art braking mechanism and has an object to provide an improved reel braking mechanism for a magnetic tape recording and/or reproducing apparatus which contributes to downscaling of the video tape recorder and in which even though each reel is driven in any one of opposite directions conforming to the respective directions of turn and departure of the length of magnetic recording tape relative to the associated brake pads the braking forces applied to those reels can be set to a desired value.

To this end, the present invention is applied to a reel braking mechanism for the magnetic tape recording and/or reproducing apparatus of a type comprising first and second reels, and first and second reel support bases for rotatably supporting thereon the first and second reels, respectively. The first and second reels are adjustably movable together with the first and second reel support bases between a first cassette position corresponding to the hub-to-hub distance in a first tape cassette and a second cassette position corresponding to the hub-to-hub distance in a second tape cassette which has a size different from the size of the first tape cassette.

The reel braking mechanism of the present invention usable in the magnetic tape recording and/or reproducing apparatus of the type discussed above includes a brake lever movably mounted on each of the first and second reel support bases through a support pin. The brake lever has a first arm engageable with the corresponding reel and a second arm on one side of the support pin remote from the first arm. The brake lever being movable between an engaged position in which the first arm is engaged with the corresponding reel to hold the latter at a standstill and a disengaged position in which the first arm is disengaged from the corresponding reel. A pushing means is movably mounted on a chassis of the magnetic recording and/or reproducing apparatus for pushing the second arm, regardless of the position of the corresponding reel, to urge the brake lever towards the engaged position to thereby cause the first arm to be brought into frictional engagement with the corresponding reel.

The brake lever may be normally biased to the engaged position by the action of a biasing means such as, for example, a tension spring.

In a preferred embodiment of the present invention, the pushing means comprises a slide plate movable between a pushing position, at which the slide plate is engaged with the second arm to set the brake lever at the disengaged position, and a release position at which the slide plate is not engaged with the second arm. It includes a pushing piece selectively engageable with the second arm regardless of the position of the corresponding reel, and a drive element for selectively driving the slide plate between the pushing and release positions. In such case, the direction of movement of the slide plate between the pushing and release positions may extend so as to be perpendicular to or inclined relative to the direction of movement of the corresponding reel between the first and second cassette positions. In either case, the slide plate is preferably biased normally to the pushing position by the action of a biasing means such as, for example, a tension spring.

In another preferred embodiment of the present invention, the pushing means comprises a pivotable pushing member which is pivotable between a pushing position, at which regardless of the position of the corresponding reel the pushing member is engaged with the second arm to urge the brake lever to the disengaged position, and a release position at which the pushing member is not engaged with the second arm. It, also, includes a drive element capable of selectively assuming one of first and second states different from each other, and a pivot lever interposed between the drive element and the pushing member to operably urge the pushing member to the pushing position when the drive element is in the first state, and to urge the pushing member to the release position when the drive element is in the second state. Even in this case, the pivot lever is preferably urged normally to the pushing position by a biasing means such as, for example, a tension spring.

The pivot lever may be of a design having one end provided with an actuating pin and the opposite end coupled with the drive element, with a generally intermediate portion thereof pivotally supported, in which case the actuating pin is operable to move the pushing member.

Alternatively, the pushing member may include a plate-like pushing piece having a length corresponding to the distance of movement of the corresponding reel between the first and second cassette positions, a pusher body formed integrally with one end of the pushing piece so as to extend therefrom in a direction substantially transverse thereto and having a bearing hole defined therein for receiving the actuating pin, and a pair of support lugs formed integrally with one end of the pusher body remote from the pushing piece.

According to the present invention, the brake lever for each of the supply and take-up reels is pivotally mounted on the corresponding reel support base. The pushing means for driving this brake lever is mounted on a chassis of the magnetic tape recording and/or reproducing apparatus such as a video tape recorder. Accordingly, the respective reel support base may have a relatively small size effective to allow the magnetic tape recording and/or reproducing apparatus as a whole to have a reduced thickness.

Also, the single brake lever suffices for each of the reels regardless of the size of the tape cassette. Therefore, the braking force acting on the corresponding reel when the first cassette is loaded does not change with the braking force acting on the corresponding reel when the second cassette is loaded. Hence, the uniform braking force can be obtained regardless of the size of the cassette loaded in the video tape recorder.

In addition, since the brake lever associated with each of the reels is pivotally mounted on the respective reel support base, the relation in position between the brake lever and the corresponding reel can be kept constant. The respective braking forces acting on the supply and take-up reels can be adjusted to a desired value even though the corresponding reel is rotated in a direction conforming to the direction of turn or departure of the length of magnetic recording tape relative to the first arm of the associated brake lever.

DESCRIPTION OF THE PREFERRED EMBODIMENTS

Some preferred embodiments of the present invention will hereinafter be described reference to the accompanying drawings in which, except for FIGS. 13 and 14, like parts are designated by like reference numerals.

Figure 1:
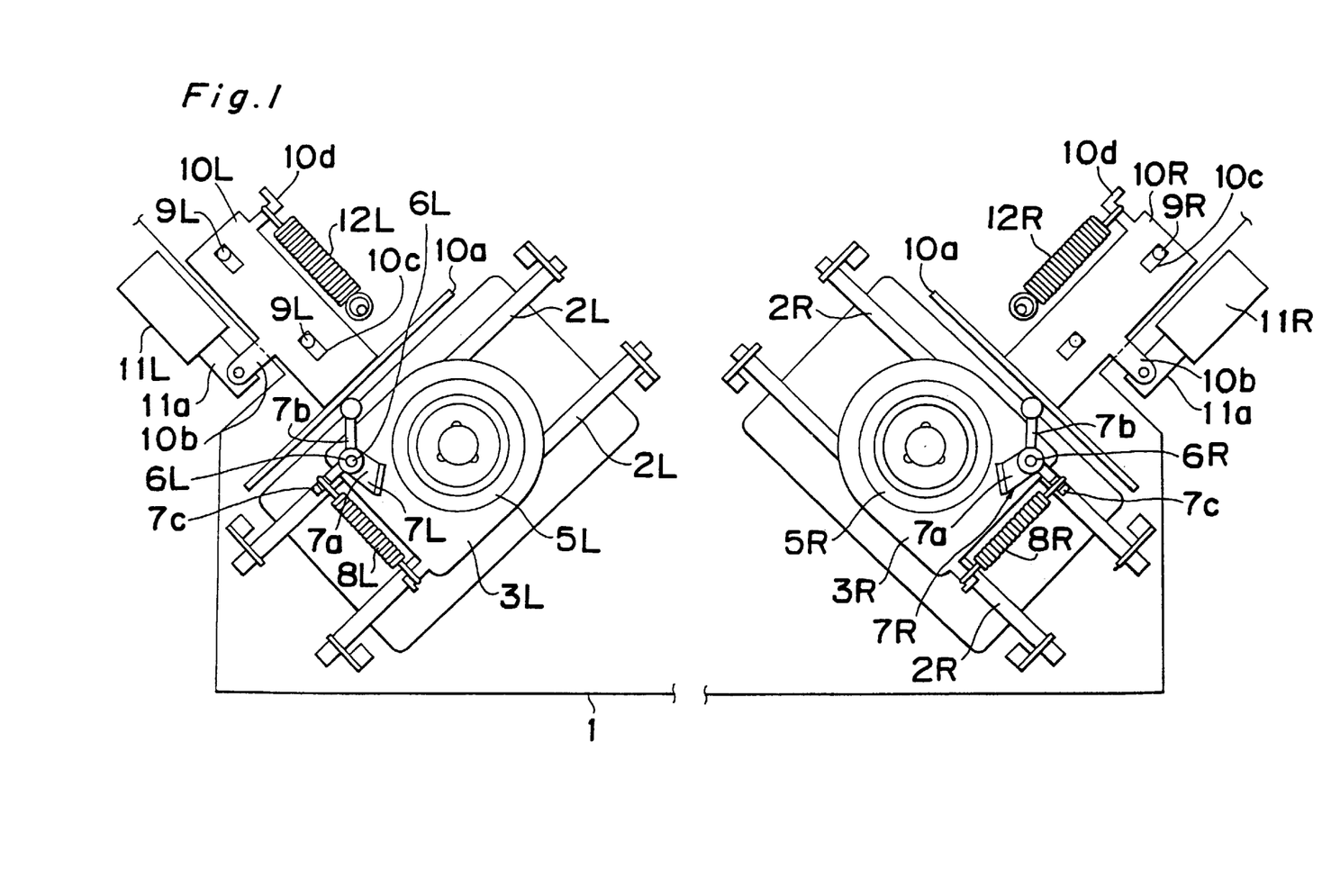
FIG. 1 is a schematic top plan view showing supply and take-up reels of a video tape recorder utilizing a reel braking mechanism according to a first preferred embodiment of the present invention.
Figure 2:
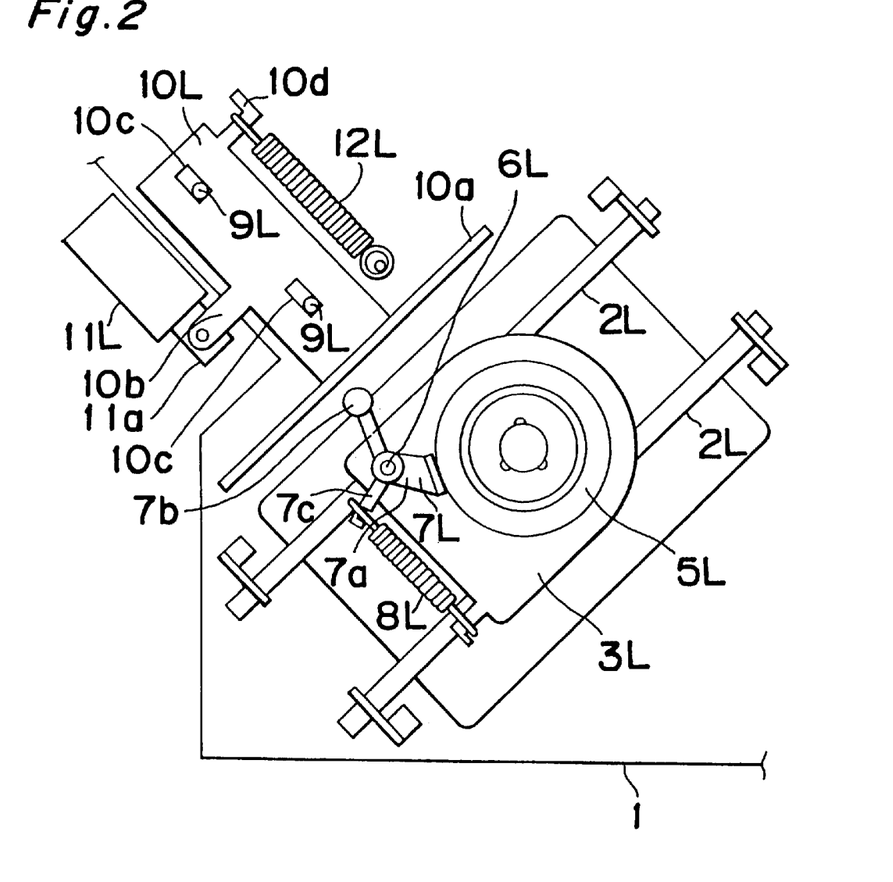
FIG. 2 is a schematic top plan view showing only the supply reel and its associated parts of the video tape recorder shown in FIG. 1, and also a corresponding brake lever pivoted to an engaged position.
Figure 3:
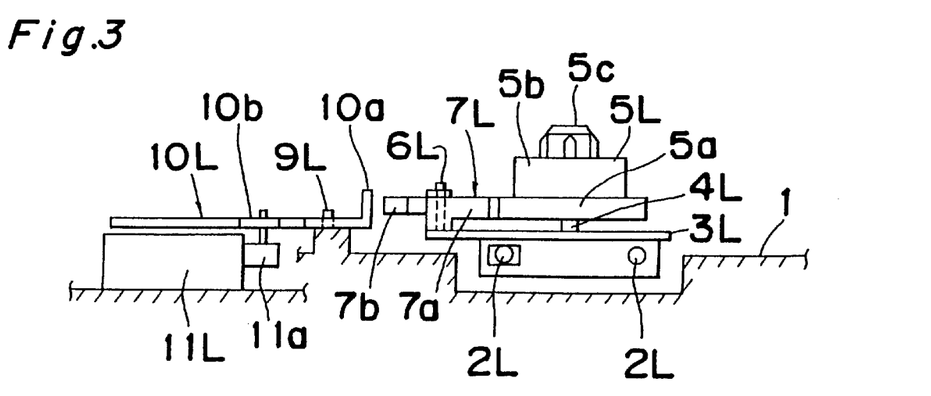
FIG. 3 is a schematic side view of the supply reel and its associated parts of the video tape recorder shown in FIG. 2.

First Embodiment—FIGS. 1 to 3

A video tape recorder shown in FIG. 1 includes a reel support chassis 1 having two pairs 2 of parallel guide rods 2L, 2R mounted thereon. The parallel guide rods 2L of one pair and the parallel guide rods 2R of the other pair are so laid on the chassis 1 as to converge at a point away from an imaginary line drawn so as to pass through respective axes of rotation of supply and take-up reels 5L and 5R.

The supply reel 5L is rotatably mounted on a supply reel support base 3L through a stud shaft 4L formed integrally with the support base 3L in coaxial relation to the supply reel 5L. Similarly, the take-up reel 5R is rotatably mounted on a take-up reel support base 3R through a stud shaft 4R formed integrally with the support base 3L in coaxial relation to the take-up reel 5R. The supply and take-up reels 5L and 5R are movably mounted on the parallel guide rods 2L and 2R, respectively, in a known manner, and are movable between a standard cassette position and a compact cassette position. Thus, when the standard tape cassette or the compact tape cassette is loaded in the video tape recorder, the supply and take-up reels 5L and 5R are held at the standard cassette position or the compact cassette position, respectively. When the compact cassette is loaded in the video tape recorder while the supply and take-up reels 5L and 5R are held at the standard cassette position, the supply and take-up reels 5L and 5R can be simultaneously moved to the compact cassette position in response to the loading of the compact cassette in the video tape recorder.

Although not shown, the simultaneous movement of the supply and take-up reels 5L and 5R between the standard and compact cassette positions is accomplished by means of a suitable synchronous drive mechanism. However, since the synchronous drive mechanism does not constitute subject matter of the present invention, no detail thereof will be herein discussed for the sake of brevity.

The supply and take-up reels 5L and 5R may be of an identical shape and each may comprise a radially outwardly extending reel flange 5a formed integrally with a generally cylindrical reel body 5b, a spindle 5c and a stud shaft 4L or a radially outwardly extending reel flange formed integrally with a spindle and a stud shaft. As is well known to those skilled in the art, the spindle 5c of each of the supply and take-up reels 5L and 5R is so shaped and so sized as to be engageable in a corresponding hub in any one of the standard and compact tape cassettes.

The manner in which the supply and take-up reels 5L and 5R are simultaneously movably mounted on the respective pairs of the parallel guide rods 2L and 2R through the associated support bases 3L and 3R may be identical with that shown in FIGS. 13 and 14 or that disclosed in the Japanese Laid-open Patent Publication No. 6-36395 referred to hereinbefore.

While the reel braking mechanism for each of the supply and take-up reels 5L and 5R will hereinafter be described in detail, reference will be made only to the reel braking mechanism associated with the supply reel 5L in the subsequent description for the sake of brevity, because the reel braking mechanisms used in association with the reels 5L and 5R, respectively, are of an identical construction. It is, however, to be noted that in FIG. 1, component parts of the reel braking mechanism for the take-up reel 5R which are like to those of the braking mechanism for the supply reel 5L are designated by reference numerals similar to those used in connection with the component parts of the reel braking mechanism for the supply reel 5L, but affixed with a character "R" in place of the character "L".

The support base 3L has a pivot pin 6L secured thereto and a brake lever 7L is pivotally mounted on the support base through the pivot pin 6L for pivotal movement about the pivot pin 6L. This brake lever 7L is of a generally U-shaped one-piece structure including a first arm 7a frictionally engageable with the reel flange 5a of the supply reel 5L, a second arm 7b engageable with a plate-like pushing piece 10a formed integrally with a slide plate 10L as will be described later, and an engagement finger 7c.

A biasing spring, for example, a tension spring 8L is suspended between the engagement finger 7c and a portion of the support base 3L to urge the brake lever 7L normally counterclockwise about the pivot pin 6L to assume an engaged position as shown in FIG. 2. So long as the brake lever 7L is so biased counterclockwise about the pivot pin 6L to the engaged position, the first arm 7a of the brake lever 7L is held in contact with the reel flange 5a of the supply reel 5L to apply a braking force to the supply reel 5L. In this condition, the supply reel 5L is restrained from being rotated about the stud shaft 4L.

In order for the brake lever 7L to be pivoted to a disengaged position as shown in FIG. 1 against the tension spring 8L regardless of the position of the supply reel 5L, that is, in order for the first arm 7a of the brake lever 7L to be separated from the reel flange 5a of the supply reel 5L, a pushing means is employed. In the illustrated embodiment, this pushing means comprises a solenoid unit 11L fixedly mounted on the chassis 1 of the video tape recorder and a slide plate 10L including an elongated pushing piece 10a.

The solenoid unit 11L may be of any known structure and includes a plunger 11a movable between an advanced position shown in FIG. 1 and a retracted position shown in FIG. 2 in a direction perpendicular to the direction of movement of the supply reel 5L. For this purpose, the slide plate 10L has one side edge formed integrally with a connecting tongue 10b through which the slide plate 10L is drivingly coupled with a free end of the plunger 11a. The elongated pushing piece 10a, referred to herein above, is integrally formed with one end of the slide plate 10L adjacent to the supply reel 5L and is bent to extend upright relative to the body of the slide plate 10L. This elongated pushing piece 10a has a length corresponding to the distance of movement of the supply reel 5L between the standard and compact cassette positions.

The stroke of movement of the slide plate 10L above the chassis 1 between the advanced and retracted position is determined by the size of a pair of guide slots 10c, defined in the slide plate 10L, in cooperation with respective guide pins 9L loosely engaged in those guide slots 10c. This slide plate 10L is normally biased to the advanced position by the action of a tension spring 12L suspended between a fixing point on the chassis 1 and an engagement finger 10d formed integrally with the opposite side edge of the slide plate 10L remote from the connecting piece 10b.

The advanced position for the slide plate 10L biased by the tension spring 12L in the manner described above is so defined as to permit the elongated pushing piece 10a of the slide pate 10L to urge the second arm 7b of the brake lever 7L so that the brake lever 7L can be pivoted clockwise about the pivot pin 6L against the tension spring 8L to assume the disengaged position as shown in FIG. 1.

In the illustrated embodiment, the solenoid unit 11L is so designed that when it is electrically energized, the solenoid plunger 11a can be retracted against the tension spring 12L, but when it is deenergized, the solenoid plunger 11a can project outwardly as biased by the tension spring 12L. Accordingly, when the solenoid plunger 11a is retracted, the slide plate 10L is moved to the retracted position against the tension spring 12L. So long as the slide plate 10L is held at the retracted position, the elongated pushing piece 10a is spaced a slight distance from the second arm 7b of the brake lever 7L then biased to the engaged position by the action of the tension spring 8L as shown in FIG. 2. However, unless the braking force transmitted from the first arm 7a to the reel flange 5a is affected, the elongated pushing piece 10a may be held in contact with the second arm 7b when the slide plate 10L is held at the retracted position. As a matter of design, the brake lever 7L is pivoted to the disengaged position against to the tension spring 8L when the solenoid plunger 11a is projected as pulled by the tension spring 12L.

Alternatively, if the solenoid unit 11L is of a type including a built-in permanent magnet exerting a magnetic force of attraction or repulsion acting on the solenoid plunger, the use of the tension spring 12L can be advantageously dispensed with. Also, as is the case with the alternative embodiment of the present invention described later, arrangement may be made that when the solenoid unit is electrically energized to retract the solenoid plunger, the elongated pushing piece causes the brake lever to pivot to the disengaged position. In any event, whether retraction of the solenoid plunger results in the pivotal movement of the brake lever to the engaged position or whether it results in the pivotal movement of the brake lever to the disengaged position depends on a of choice of a circuit design in the video tape recorder.

Considering that the solenoid unit 11L itself is a rather bulky component part, the solenoid unit 11L when being mounted on the chassis 1 is to be positioned outside and clear from the outer contour of the standard tape cassette, that is larger in size than the compact tape cassette, when the standard tape cassette is loaded in the video tape recorder. On the other hand, if the space available does not allow the solenoid unit 11L to be positioned outside and clear from the outer contour of the standard tape cassette, the chassis 1 may be formed with a stepped-down area for accommodating the solenoid unit 11L, when the latter is mounted on the chassis 1, so that the solenoid unit 11L can be positioned at least partly below and clear from the bottom of the standard tape cassette. By so doing, the video tape recorder can be manufactured having a reduced thickness.

The operation of the reel braking mechanism according to the first embodiment shown in FIGS. 1 to 3 will now be described.

On loading a magnetic tape cassette in the video tape recorder, the user should manipulate a cassette selector (not shown) to cause the supply and take-up reels 5L and 5R to move to either the standard cassette position or the compact cassette position depending on the standardized size of the video tape cassette the user is going to load in the video tape recorder. Although the take-up reel 5R is drivingly coupled with a drive motor (not shown) during information recording or information reproduction, the solenoid units 11L and 11R are electrically deenergized shortly before or simultaneously therewith. In this condition, the slide plates 10L and 10R are held at the advanced position by the action of the associated tension springs 12L and 12R.

With the slide plates 10L and 10R held at the advanced position, the respective pushing pieces 10a integral with the slide plates 10L and 10R cause the adjacent brake levers 7L and 7R to assume the disengaged position against the associated tension springs 8L and 8R as shown in FIG. 1 in the manner described hereinabove. During this condition, the length of magnetic tape within the loaded tape cassette can travel from one hub, then engaged with the supply reel 5L, onto the other hub engaged with the take-up reel 5R or from the other hub engaged with the take-up reel 5R back to the one hub engaged with the supply reel 5L.

By way of example, when the user pushes a PAUSE button to bring the length of magnetic tape to a pause or a STOP button subsequent to termination of information recording or reproduction, the supply of a drive from the drive motor to either one of the supply and take-up reels is cut off. The solenoid units 11L and 11R are electrically energized to retract the corresponding solenoid plungers 11a. In response to retraction of the solenoid plungers 11a, the slide plates 10L and 10R are moved towards the retracted position against the associated tension springs 12L and 12R, allowing the brake levers 7L and 7R to be pivoted to the engaged position as biased by the corresponding tension springs 8L and 8R as shown in FIG. 2. In this way, the supply and take-up reels 5L and 5R are braked.

The solenoid units 11L and 11R may be electrically energized at the same time. However, if a slight time lag exists between the respective timings of energization of the supply and take-up reels 5L and 5R, that is, if one of the reels from which the length of magnetic tape is drawn towards the other of the reels is first brought to a halt and the other of the reels is subsequently brought to a halt slightly after such one of the reels has been brought to a halt, a loosening of the length of magnetic tape extending between the hubs in the tape cassette can advantageously be absorbed.

In the foregoing embodiment shown in FIGS. 1 to 3, each of the slide plates 10L and 10R has been described as movable in a direction perpendicular to the direction of movement of the supply or take-up reels 5R. Also and has also each of the plates 10L and 10R has been described as provided with the respective pushing piece 10a extending perpendicular to the direction of movement of the associated slide plate 10L or 10R. However, considering the spirit of the present invention, the solenoid units 11L and 11R and, hence, the slide plates 10L and 10R may take any suitable disposition provided that the elongated pushing pieces 10a can effectively operate to pivot the associated brake levers 7L and 7R from the engaged position towards the disengaged position regardless of the position of the tape cassette along the stroke of movement thereof.

Figure 4:
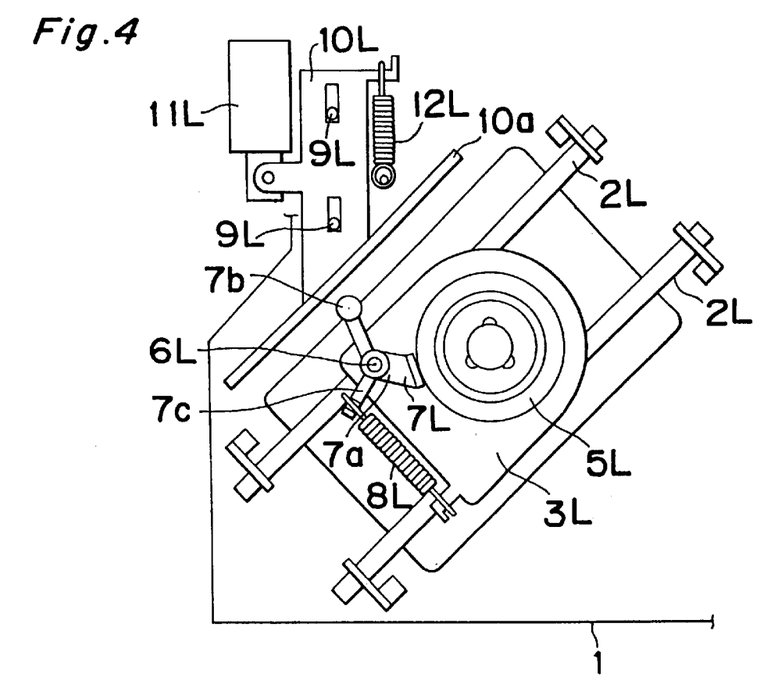
FIG. 4 is a schematic top plan view of only the supply reel, showing a modified form of the reel braking mechanism of the first embodiment of the present invention.
Figure 5:
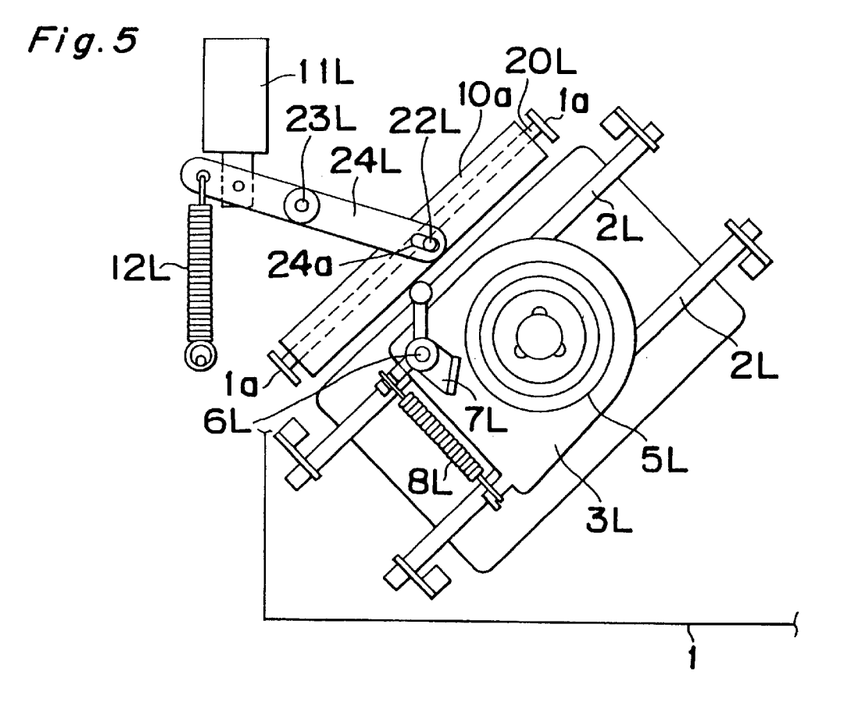
FIG. 5 is a schematic top plan view showing only the supply reel employed in a video tape recorder utilizing a reel braking mechanism according to a second preferred embodiment of the present invention, and also the brake lever pivoted to the disengaged position.
Figure 6:
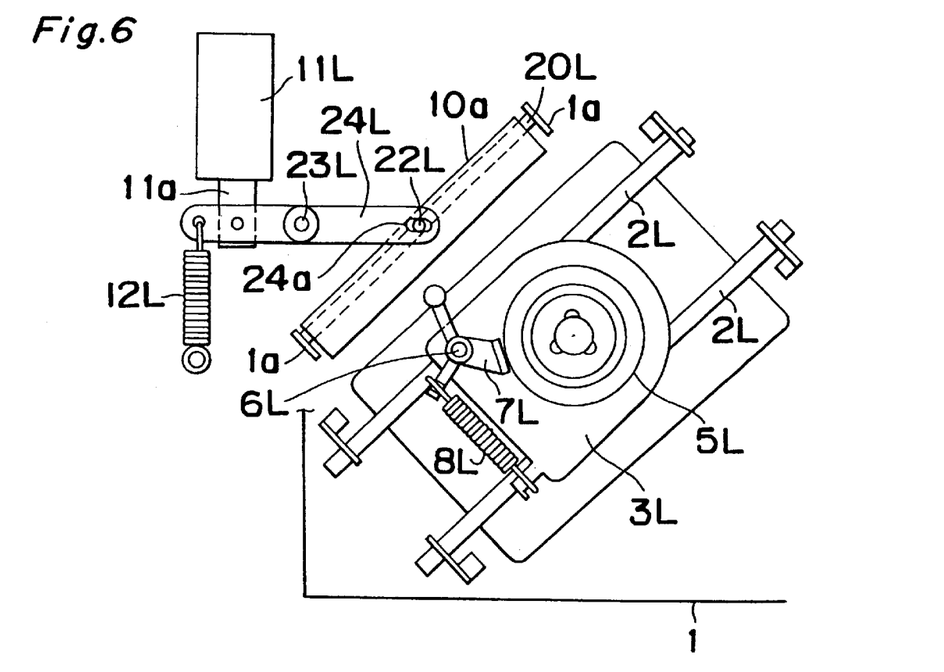
FIG. 6 is a schematic top plan view similar to FIG. 5, showing the brake lever pivoted to an engaged position.

In a modification shown in FIG. 4, each elongated pushing piece 10a is integrally formed with the respective slide plate 10L or 10R so as to extend at an angle relative to the direction of movement of the body of the slide plate 10L or 10R and parallel to the direction of movement of the adjacent reel 10L or 10R. In this modification, respective directions of movement of the slide plate 10L and 10R and, hence, those of the solenoid plungers 11a of the associated solenoid units 11L and 11R lie angles other than at right angles relative to the directions of movement of the adjacent reels 5L and 5R. Even the reel braking mechanism for each of the supply and take-up reels 5L and 5R functions in a manner substantially similar to that according to the previously described embodiment. However the stroke of movement of each slide plate 10L or 10R according to this modification is longer than that in the previously described embodiment.

Second Embodiment—FIGS. 5 to 8

In the foregoing embodiment the pushing means for each of the supply and take-up reels 5L and 5R has been described as comprising the slide plate 10L and 10R formed integrally with the respective pushing piece 10a. However, in the second preferred embodiment of the present invention, a pushing means for each of the supply and take-up reels 5L and 5R comprises a generally elongated plate-like pushing piece pivotable about an axis parallel to the lengthwise direction of the elongated plate-like pushing piece in response to movement of the solenoid plunger. Hereinafter, the details of the pushing means employed in a reel braking mechanism associated only with the supply reel 5L will be described.

The elongated plate-like pushing piece 10a employed in the second embodiment of the present invention has its opposite end bent to lie perpendicular to the body of the pushing piece 10a. This elongated plate-like pushing piece 10a is mounted on the chassis 1 with its opposite bent ends mounted on a support shaft 20L which is journalled by a pair of lugs 1a formed integrally with the chassis 1 and spaced from each other a distance greater than the length of the elongated plate-like pushing piece 10a. Accordingly, this elongated plate-like pushing piece 10a is pivotable about the support shaft 20L between a pushing position shown in FIG. 7 and a release position shown in FIG. 8.

Figure 8:
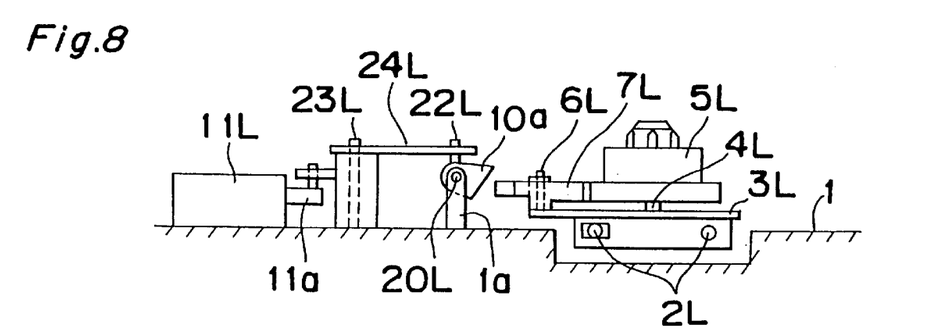
FIG. 8 is a schematic side view of the supply reel and its associated parts of the video tape recorder shown in FIG. 6.

The solenoid plunger 11a and the elongated plate-like pushing piece 10a are operatively coupled with each other by means of a pivot lever 24L pivotally mounted at its generally intermediate portion on the chassis 1 through a pivot pin 23L. More specifically, the pivot lever 24L has one end formed with a bearing slot 24a into which an engagement pin 22L rigidly secured to a generally intermediate portion of the pushing piece 10a so as to extend perpendicular thereto is loosely engaged. The other end of the pivot lever 24L is connected with the tension spring 12L and, accordingly, the pivot lever 24 is normally biased counterclockwise about the support pin 23L by the action of the tension spring 12L. With the pivot lever 24L so biased counterclockwise, the pushing piece 10a is set to the release position as shown in FIG. 8. Accordingly, during this condition the brake lever 7L is held in the engaged position, applying a braking force to the supply reel 5L through the first arm 7a thereof by the action of the tension spring 8L.

Figure 7:
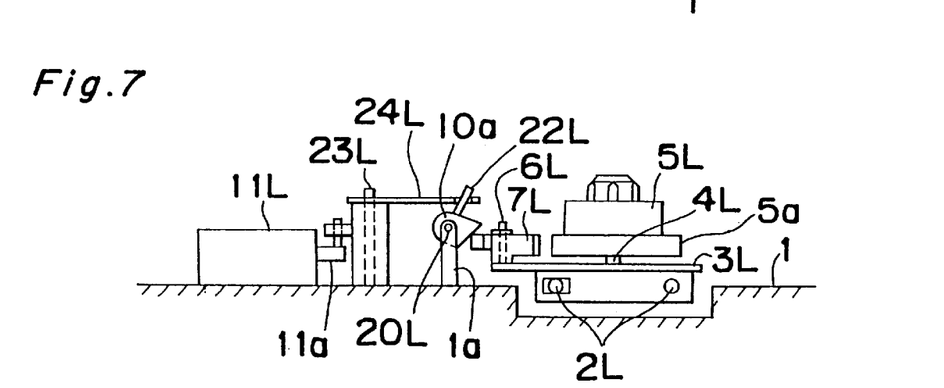
FIG. 7 is a schematic side view of the supply reel and its associated parts of the video tape recorder shown in FIG. 5.

Pivotal movement of the pivot lever 24L about the support pin 23L against the tension spring 12L, that is, pivotal movement of the pushing piece 10a to the pushing position shown in FIG. 7, is accomplished in response to retraction of the solenoid plunger 11a. For this purpose, the solenoid plunger 11a has a free end pivotally connected with a portion of the pivot lever 24 between the support pin 23L and the end thereof remote from the pushing piece 10a.

In the embodiment shown in FIGS. 5 to 8, when the solenoid unit 11L is electrically energized with the solenoid plunger 11a consequently retracted, the pushing piece 10a is pivoted towards the pushing position to thereby urge the second arm 7b of the brake lever 7L, causing the brake lever 7L to pivot clockwise about the pivot pin 6L towards the disengaged position to release application of the braking force from the supply reel 5L. On the other hand, when the solenoid unit 11L is electrically deenergized with the solenoid plunger 11a consequently advanced, the pushing piece 10a is pivoted towards the release position to thereby allow the brake lever 7L to pivot counterclockwise about the pivot pin 6L towards the engaged position by the action of the tension spring 8L to apply the braking force to the supply reel 5L. In other words, the reel braking mechanism according to this embodiment is so designed and so configured that in response to selective energization and deenergization of the solenoid unit 11L, the supply reel 5L can be held in a freely rotatable state and a braked state, respectively.

It is, however, to be noted that depending on the choice of the circuit design in the video tape recorder, the solenoid plunger 11a can be selectively advanced and retracted in response to energization and deenergization of the solenoid unit 11L, respectively.

Figure 9:
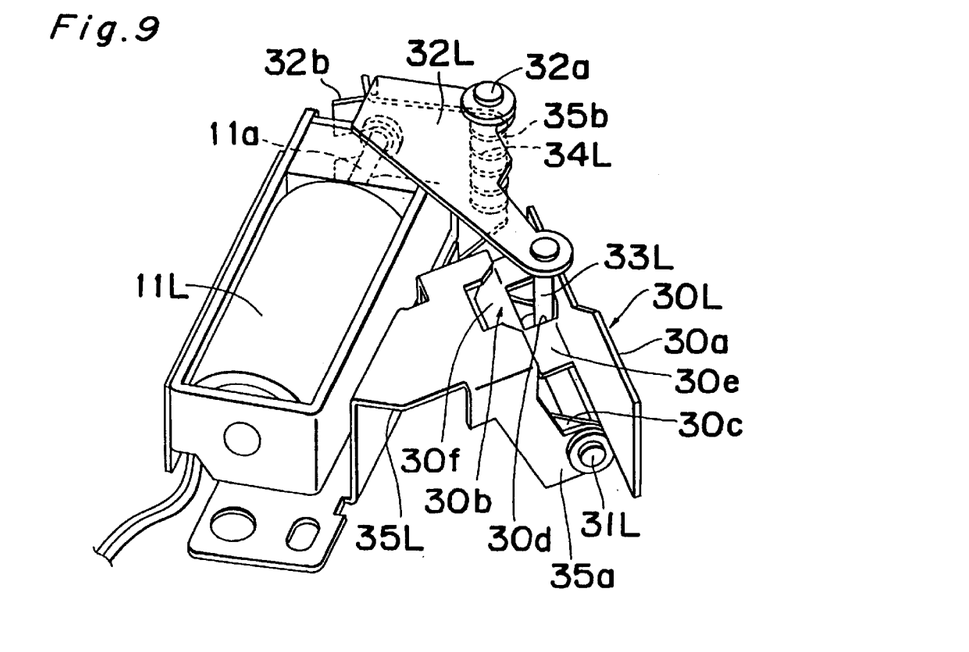
FIG. 9 is a perspective view, on an enlarged scale, showing a reel braking mechanism according to a third preferred embodiment of the present invention which is employed in association with the supply reel.
Figures 10, 11, 12:
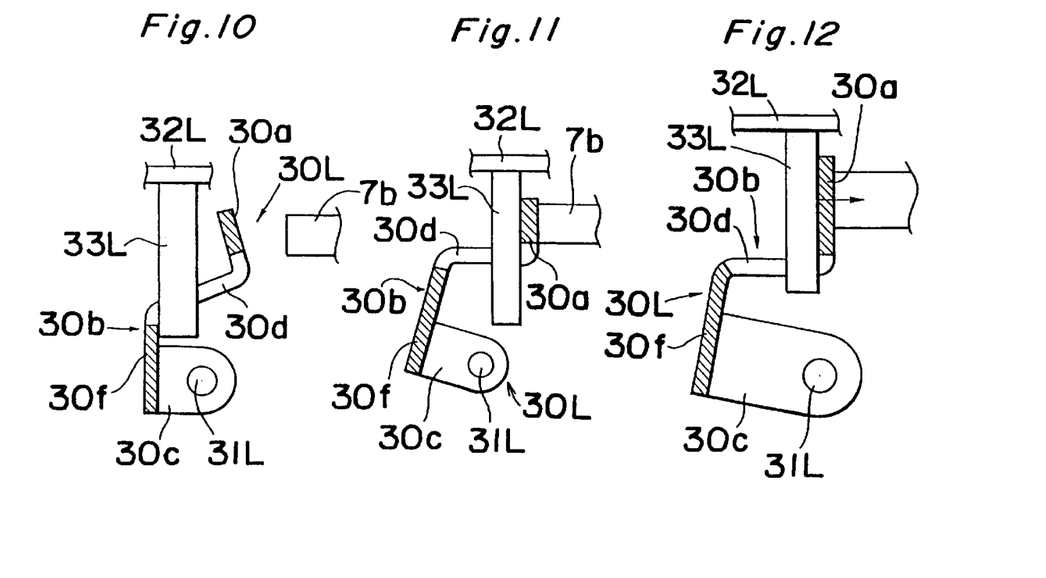
FIG. 10 is a schematic side sectional view showing the brake lever pivoted to the engaged position in the reel braking mechanism shown in FIG. 9.
FIG. 11 is a schematic side sectional view showing the brake lever pivoted to the disengaged position in the reel braking mechanism shown in FIG. 9.
FIG. 12 is a schematic side sectional view of only the brake lever, showing a modification of the third preferred embodiment of the present invention.

Third Embodiment—FIGS. 9 to 11

The third embodiment of the present invention differs from any one of the foregoing embodiments thereof so far as the details of the pushing means is concerned. Accordingly, in describing the third embodiment of the present invention, the details of only a pushing means operatively associated with the supply reel 5L will be described. However, it is to be noted that a similar pushing means can be used with the take-up reel 5R.

The pushing means shown in FIGS. 9 to 11 for pivoting the brake lever 7L to the disengaged position against the tension spring 8L regardless of the position of the supply reel 5L makes use of a pushing member 30L which is pivotable between pushing and release positions. This pushing member 30L comprises a plate-like pushing piece 30a of a length corresponding to the distance of movement of the supply reel 5L between the standard and compact cassette positions along the parallel guide rods 2L and extending parallel to the parallel guide rods 2L, a pusher body 30b formed integrally with one end of the pushing piece 30a so as to extend transverse thereto, and a pair of support lugs 30c formed integrally with one end of the pusher body 30b remote from the pushing piece 30a.

The pusher body 30b of the pushing member 30L includes a transverse section 30e formed integrally with the pushing piece 30a so as to extend transverse thereto and having a bearing hole 30d such as, for example, a slot defined therein, and a leg section 30f extending from a portion of the transverse section 30e remote from the pushing piece 30a and having the pair of the bearing lugs 30c defined therein. The pushing member 30L is supported with the bearing lugs 30c of the pusher body 30b pivotally mounted on corresponding brackets 35a by means of a support shaft 31L. Accordingly, the pushing member 30L can be pivotable between the release position shown in FIG. 10 and the pushing position shown in FIG. 11 about the support shaft 31L. It is to be noted that the brackets 35a for supporting the pushing member 30L in the manner described above may be part of the chassis 1 or, alternatively, part of a plate-like frame 35L separate from the chassis 1 as shown and adapted to be fixedly mounted on the chassis 1 after the solenoid unit 11L and the pushing means have been mounted on such frame 35L.

A pivot lever 32L is interposed between the solenoid plunger 11a and the pushing member 30L for transmitting a movement of the solenoid plunger 11a to the pushing member 30L. This pivot lever 32L is pivotally mounted by means of a bearing pin 32a on a free end of a post 35b which is formed integrally with, or rigidly secured to, the chassis 1 or the frame 35L. One end of the pivot lever 32L adjacent the pushing member 30L is connected with an actuating pin 33L which extends in a direction perpendicular to the lengthwise direction of the pivot lever 32L so as to be engaged in the bearing hole 30d in the pushing member 30L. The opposite end of the pivot lever 32L adjacent the solenoid unit 11L is so bent as to define a connecting piece 32b extending in a direction conforming to the direction of extension of the actuating pin 33L and is pivotally coupled with a free end of the solenoid plunger 11a through such connecting piece 32b.

The pushing means of the structure described above is so designed and so positioned that when the solenoid plunger 11a projects or advances, the pivot lever 32L can be pivoted clockwise as viewed in FIG. 9 about the bearing pin 32a, but when the solenoid plunger 11a retracts, the pivot lever 32L can pivot counterclockwise about the bearing pin 32a. However, since a biasing means is interposed between the chassis 1 or the frame 35 or the post 35b and the pivot lever 32L, the pivot lever 32L is normally biased clockwise about the bearing pin 32a by the action of this biasing means. The biasing means referred to above may be a tension spring such as employed in any one of the foregoing embodiments of the present invention, but is employed in the form of a torsion spring 34L mounted around the post 35b.

The relationship between the actuating pin 33L and the pushing member 30L that is assumed when the pivot lever 32L is biased clockwise as described above is shown in FIG. 10. As shown therein, so long as the pivot lever 32L is biased clockwise, a free end of the actuating pin 33L is held in contact with a portion of the leg section 30f of the pushing member 30L, which confronts the bearing hole 30d, to thereby urge the pushing member 30L towards the release position about the support shaft 31L. With the pushing member 30L so urged to the release position, the brake lever 7L is set to the engaged position by the action of the tension spring 8L as is the case in any one of the foregoing embodiments of the present invention with the supply reel 5L consequently held at a halt.

On the other hand, when the solenoid plunger 11a retracts, the pivot lever 32L pivots counterclockwise about the bearing pin 32a against the torsion spring 34L, and this condition is shown in FIG. 11. As shown in FIG. 11, as the pivot lever 32L pivots counterclockwise, the actuating pin 33L is brought into contact with the pushing piece 30a from the rear to push the pushing member 30L to pivot towards the pushing position about the support shaft 31L, resulting in pivotal movement of the brake lever 7L to the disengaged position against the tension spring 8L with the supply reel 5L consequently allowed to rotate freely.

As clearly shown in FIG. 11, it is preferred that when the pushing member 30L is set to the pushing position, the actuating pin 33L can assume a parallel relation to the pushing piece 30a and contact the pushing piece 30a over the entire width thereof. In such case, it will be appreciated that the pushing force transmitted from the pivot lever 32L to the pushing member 30L through the actuating pin 33L as a result of counterclockwise (as viewed in FIG. 9) movement of the pivot lever 32L can advantageously be transmitted in its entire quantity to the brake lever 7L. Moreover, if arrangement is made that when the pivot lever 32L is pivoted clockwise (as viewed in FIG. 9) against the torsion spring 34L with the pushing member 30L consequently held at the release position, the free end of the actuating pin 33L can be kept in abutment with that portion of the leg section 30f of the pushing member 30L which confronts the bearing hole 30d. The space between the free end of the second arm 7b of the brake lever 7L and the pushing piece 30a can be kept constant.

In the embodiment shown in FIGS. 9 to 11, the support shaft 31L about which the pushing member 30L pivots has been shown as positioned below the actuating pin 33L, but on one side of the extension of the actuating pin 33 adjacent the solenoid unit 11L so long as the pushing member 30L is held at the pushing position as shown in FIG. 11. However, if as shown in FIG. 12 the support shaft 31L is positioned substantially immediately below the actuating pin 33L so long as the pushing member 30L is held at the pushing position. The pushing force transmitted from the pushing piece 30a to the second arm 7b of the brake lever 7L can be assured to act on a surface of the pushing piece 30a in a direction at right angles thereto.

In describing the various preferred embodiments of the present invention, the solenoid unit has been employed as a source of drive of the pushing means. However, in place of the solenoid unit, an electric reversible drive motor may be employed. In this case a rotary motion of a drive shaft of the drive motor has to be drivingly coupled with the slide plate or the pivot lever through a gear train or a rack-and-pinion system. In addition, movement of the supply and take-up reels between the standard and compact cassette positions may take place either simultaneously or at different times.

Also, in describing the various preferred embodiments of the present invention, reference has been made to the standard and compact tape cassettes that are used one at a time in the VHS-ready video tape recorder. However, the present invention may not be always limited to the use of such standard and compact tape cassettes, but can equally be applied to the use of tape cassettes of different size which are utilized in any other magnetic information recording and/or reproducing apparatus. By way of example, where the magnetic tape recording and/or reproducing apparatus is of a design capable of accommodating large, medium and compact tape cassettes, the supply and take-up reels employed therein has to be repositioned to one of three positions.

Furthermore, the present invention is also applicable to the system wherein a single magnetic tape recording and/or reproducing apparatus is so designed as to accomplish information recording or reproduction on or from magnetic recording tapes of different standards and the magnetic tapes of the different standards are accommodated in respective tape cassettes of different size.

What is claimed is:

1. A reel braking mechanism for a magnetic tape recording and/or reproducing apparatus and operable with at least first and second tape cassettes of different sizes, the apparatus comprising a stationary support structure, first and second reels, and first and second reel support bases for rotatably supporting thereon the first and second reels, respectively, at least one of the first and second reel support bases being movably mounted on the support structure for movement along an adjustment path between at least first and second cassette positions separated from one another by a predetermined distance, said reel braking mechanism comprising:

a brake lever comprising a first arm and a second arm;
   a support pin mounted to said brake lever between said first arm and said second arm for pivotally mounting said brake lever to the at least one reel support base such that said brake lever is pivotal between a reel-engaging position and a reel-disengaging position, and such that said brake lever is movable with the at least one support base along the adjustment path;
   a brake lever biasing member for biasing said brake lever towards said reel-engaging position;
   an elongated pushing element for movement between a pushing position, in which said pushing element holds said brake lever in said reel-disengaging position, and a release position, in which said pushing element does not hold said brake lever in said reel-disengaging position, said pushing element extending in a direction parallel to the adjustment path and having a length sufficient such that said pushing element is able to pivot said brake lever regardless of a position of the at least one support base along the adjustment path; and
   a pushing mechanism drivingly coupled with said pushing element to drive said pushing element between said pushing position and said release position so as to move said brake lever from said reel-engaging position towards said reel-disengaging position in response to said pushing element moving from said release position towards said pushing position.

2. The reel braking mechanism as claimed in claim 1, wherein said pushing mechanism comprises an actuator capable of assuming one of first and second operative states, a slide plate coupled with said pushing element for movement between an advanced position at which said pushing element is moved to said pushing position and a retracted position at which said pushing element returns to said release position, and a linkage drivingly connecting said slide plate with said actuator such that when said actuator assumes said first operative state, said slide plate is driven towards said advanced position.

3. The reel braking mechanism as claimed in claim 2, wherein said slide plate moves between said advanced and retracted positions in a direction perpendicular to the adjustment path.

4. The reel braking mechanism as claimed in claim 2, wherein said slide plate moves between said advanced and retracted positions in a direction inclined relative to the adjustment path.

5. The reel braking mechanism as claimed in claim 2, further comprising a slide plate biasing member for biasing said slide plate towards said advanced position.

6. The reel braking mechanism as claimed in claim 2, further comprising a slide plate biasing member for biasing said slide plate towards said retracted position.

7. The reel braking mechanism as claimed in claim 1, wherein said pushing mechanism comprises an actuator capable of assuming one of first and second operative states, a pivot lever interposed between said actuator and said pushing element, and a linkage drivingly connecting said pivot lever with said actuator such that when said actuator is assuming said second operative state, said pivot lever is pivoted in a pushing direction required for said pushing element to be moved towards said pushing position.

8. The reel braking mechanism as claimed in claim 7, further comprising a pivot lever biasing member for biasing said pivot lever in a release direction counter to said pushing direction to thereby hold said pushing element at said release position.

9. The reel braking mechanism as claimed in claim 8, wherein said pivot lever has opposite ends thereof coupled with said pushing element and said actuator, respectively, and a pivotal-intermediate portion.

10. The reel braking mechanism as claimed in claim 8, wherein said pivot lever has one end provided with an actuating pin for moving said pushing element, an opposite end coupled with said actuator, and a pivotal-intermediate portion.

11. The reel braking mechanism as claimed in claim 7, wherein said pivot lever has one end provided with an actuating pin for moving said pushing element, an opposite end coupled with said actuator, and a pivotal-intermediate portion.

12. The reel braking mechanism as claimed in claim 11, wherein said pushing element includes a pusher body formed integrally with said pushing element, said pusher body extending from said pushing element in a substantially transverse direction to said pushing element, a bearing hole defined in said pusher body for receiving said actuating pin, and a pair of support lugs formed integrally with said pusher body.

13. The reel braking mechanism as claimed in claim 1, further comprising:

the stationary support structure;
the first reel support base;
the second reel support base; and
the at least one of the first and second reel support bases being movably mounted on the support structure for movement along the adjustment path between at least the first and second cassette positions by the predetermined distance.

14. A reel braking mechanism for a magnetic tape recording and/or reproducing apparatus and operable with at least first and second tape cassettes of different sizes, the apparatus comprising a stationary support structure, first and second reels, and first and second reel support bases for rotatably supporting thereon the first and second reels, respectively, at least one of the first and second reel support bases being movably mounted on the support structure for movement along an adjustment path between at least first and second cassette positions separated from one another by a predetermined distance, said reel braking mechanism comprising:

a brake lever comprising a first arm and a second arm;
a support pin mounted to said brake lever between said first arm and said second arm for pivotally mounting said brake lever to the at least one reel support base such that said brake lever is pivotal between a reel-engaging position and a reel-disengaging position, and such that said brake lever is movable with the at least one support base along the adjustment path;
a brake lever biasing member for biasing said brake lever towards said reel-engaging position;
an elongated pushing element mounted adjacent said brake lever for movement between a pushing position, in which said pushing element holds said brake lever in said reel-disengaging position, and a release position, in which said pushing element does not hold said brake lever in said reel-disengaging position, said pushing element extending in a direction parallel to the adjustment path and having a length at least as long as the adjustment path, said pushing element includes a pusher body formed integrally with said pushing element, said pusher body extending from said pushing element in a substantially transverse direction to said pushing element, and having a bearing hole defined in said pusher body;
a pushing mechanism drivingly coupled with said pushing element to drive said pushing element between said pushing position and said release position so as to move said brake lever from said reel-engaging position towards said reel-disengaging position in response to said pushing element moving from said release position towards said pushing position;
a pivot lever having first and second opposite ends;
an actuating pin connected with said first end of said pivot lever, said actuating pin extending in a direction perpendicular to said pivot lever and extending through said bearing hole in said pusher body; and
an actuator drivingly coupled with said second end of said pivot lever and capable of assuming one of first and second operative states such that when said actuator is assuming said first operative state, said pivot lever is pivoted in a direction required for said actuating pin to engage said pushing element to move said pushing element towards said pushing position so that said brake lever is moved from said reel-engaging position towards said reel-disengaging position against said brake lever biasing member.

15. The reel braking mechanism as claimed in claim 14, further comprising:

the stationary support structure;

the first reel support base;

the second reel support base; and the at least one of the first and second reel support bases being movably mounted on the support structure for movement along the adjustment path between at least the first and second cassette positions by the predetermined distance.

16. A reel braking mechanism for a magnetic tape recording and/or reproducing apparatus and operable with at least first and second tape cassettes of different sizes, the apparatus comprising a stationary support structure, first and second reels, and first and second reel support bases for rotatably supporting thereon the first and second reels, respectively, at least one of the first and second reel support bases being movably mounted on the support structure for movement along an adjustment path between at least first and second cassette positions separated from one another by a predetermined distance, said reel braking mechanism comprising:

a brake lever;

a pivotal member mounted to said brake lever for pivotally mounting said brake lever to the at least one reel support base such that said brake lever is pivotal between a reel-engaging position and a reel-disengaging position, and such that said brake lever is movable with the at least one support base along the adjustment path;

a brake lever biasing member for biasing said brake lever towards said reel-engaging position;

a pushing member comprising a pushing piece for pivoting said brake lever from said reel-engaging position to said reel-disengaging position, said pushing piece includes a pushing surface for engaging said brake lever, said pushing surface having a length at least as long as the adjustment path, said pushing surface being straight over an entirety of said length, and said pushing surface extending parallel with respect to the adjustment path; and a pivot lever coupled to said pushing member for moving said pushing member.

17. The reel braking mechanism according to claim 16, further comprising:

a solenoid coupled to said pivot lever.

18. The reel braking mechanism according to claim 16, wherein said pivot lever includes an actuating pin for moving said pushing member.

19. The reel braking mechanism according to claim 18, wherein said pushing member includes a pusher body formed integrally with said pushing piece, and a bearing hole defined within said pusher body for receiving said actuating pin.

20. The reel braking mechanism as claimed in claim 16, further comprising:

the stationary support structure;

the first reel support base;

the second reel support base; and the at least one of the first and second reel support bases being movably mounted on the support structure for movement along the adjustment path between at least the first and second cassette positions by the predetermined distance.

\* \* \* \* \*